Figure 1:
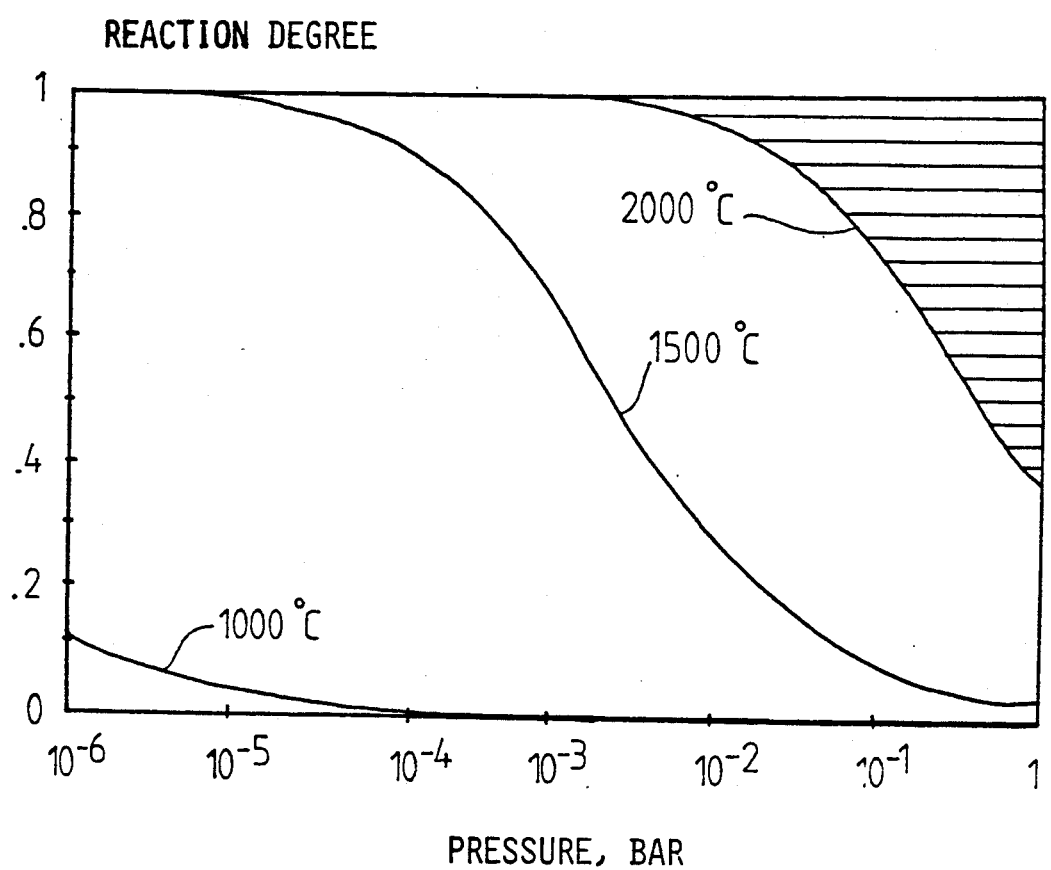

United States Patent [19]

Vesa-Pekka et al.

[11] Patent Number: 5,077,027
[45] Date of Patent: Dec. 31, 1991

[54] METHOD FOR PRODUCING SILICON HALIDES BY REDUCING SILICON TETRHALIDES UNDER A PLASMA TORCH

[75] Inventors: Judin Vesa-Pekka, Oulu; Häyhä Aarno, Helsinki; Koukkari Pertti, both of Helsinki, all of Finland

[73] Assignee: Kemira Oy, Finland

[21] Appl. No.: 530,279

[22] Filed: May 30, 1990

[51] Int. Cl.[5] .................................. C01B 33/107
[52] U.S. Cl. .................................. 423/342; 204/164; 423/341
[58] Field of Search .............. 423/341, 342, 343, 324; 204/164

[56] References Cited

PUBLICATIONS

Zhu et al., "Elemental Analysis Based on Chemiluminesence in the Laser Microbe", Analytical Chemistry 61(22) pp. 2557-2561.

Primary Examiner—Olik Chaudhuri
Assistant Examiner—Ken Horton
Attorney, Agent, or Firm—Banner, Birch, McKie & Beckett

[57] ABSTRACT

Silicon difluoride is produced by the reduction of silicon tetrafluoride in a plasma torch under argon atmosphere. Instead of the usual reducing agents finely divided silicon has now been used as a reducing agent.

9 Claims, 2 Drawing Sheets

METHOD FOR PRODUCING SILICON HALIDES BY REDUCING SILICON TETRHALIDES UNDER A PLASMA TORCH

This invention is directed to a method for producing silicon halides by reduction of a silicon tetrahlide in plasma flame under a shielding gas atmosphere. Specifically, this invention is directed to a method for producing reactive silicon fluoride and its homologues at a high temperature by use of plasma techniques.

Silicon fluoride and its homologues are useful intermediates containing silicon in a highly reactive form, and from which with a mild thermal treatment different siliconb ased products such as pure silicon for instance for light cells and silicon chips, and for silicon ceramics can be prepared.

U.S. Pat. No. 4,070,444 describes a method for producing pure semiconductor quality silicon wherein metallurgical silicon and silicon tetrafluoride ar reacted at an elevated temperature of over 1000° C. and reduced pressure to form silicon difluoride gas. While silicon difluoride gas, anyhow, is prone to decompose to its starting material, the mixture in practice has to be quenched down to a low temperature, wherein the decomposition is kinetically hindered. By cooling down to at least $-70°$ C. the product is polymerized and thereby solidified. The restriction of this method is its low yield due to its restriction of temperature tied in with resistance heating. The yield can be increased by lowering the pressure in the reaction but thereby correspondingly even the production capacity indicated as mass flow is lowered.

The use of plasma in treatment of silicon containing materials is known in the art. Hence, for example in U.S. Pat. Nos. 4,309,259, 4,377,564 and 4,439,410 the reduction of silicon containing materials in plasma for production of silicon and its compounds is described.

In U.S. Pat. No. 4,309,259 a method for hydrogenation of silicon tetrachloride in plasma using high pressurized plasma to react hydrogen and silicon tetrachloride to trichlorosilane and other hydrogenated silicon chlorides is described.

In U.S. Pat. No. 4,377,564 again is described a method for producing silicon by generating plasma in a gas flow containing a silicon compound so that the silicon compound is reduced or decomposed to silicon. Silicon tetrachloride can be as the silicon compound, and as reducing agent for example hydrogen can be used. In this publication methods and apparatus for generating plasma are explained in detail.

In U.S. Pat. No. 4,439,410 silicon is produced from silicon-containing powder by spraying the powder with a reducing agent to gas plasma together with a carrier gas. Thereafter the mixture is led to a reaction chamber surrounded by solid reducing agent in which chamber the silica is melting and reducing to fluid silicon. As reducing agent carbon has been used.

The purpose for the present invention is to provide a simplified and more economical method for producing a reactive silicon halide compound compared to the known art by reducing silicon tetrahalide in plasma flame under an inert gas atmosphere. The present invention is characterized in that in lieu of use of a foreign reducing agent, in respect to the intermediate or final product now expressly the material to be produced, namely finely divided silicon, is used as reducing agent. When as the intermediate obtained silicon halide is used by liberating silicon from it by a mild thermal treatment at the same time silicon tetrahlide is obtained which then can be recollected and used again in the method according to the invention. An advantage of the present invention is that not any separate reducing agent is needed but as reducing agent the finely divided silicon to be produced can be used and as another reagent used silicon tetrahlide can be circulated from the production of the final product.

Additionally, it has been found that when silicon tetrahalide is reduced in plasma flame under an inert gas atmosphere at a high temperature of over 2000° C., normal pressure can be used in the operation and still a high reaction degree can be achieved.

To prevent the reverse reaction of the obtained silicon halide it is preferably cooled down very quickly at the temperature region 1200°-200° C. The cooling has to be performed within about 1-2 seconds. As reducing agent metallurgical silicon powder with a particle size of under 10 μm preferably is used, and to plasma flame is fed silicon tetrafluoride and silicon preferably at a molar ratio of 0.8:1-1.5:1.

In the method of the invention reactive silicon fluoride compound is hence prepared by feeding finely divided silicon powder and gaseous silicon tetrafluoride to high frequency-induced argon plasma. The method is characterized in an essentially higher reaction temperature compared to the known art whereby the yield is high. The reaction can be conducted at normal pressure whereby a higher capacity counted on the basis of the used net effect is reached compared to the earlier methods. Additionally, the production is continuous due to the course of action of the plasma, and thereby process-technologically useful.

The silicon halide prepared according ot the present invention is a useful intermediate in the production of semiconductor quality silicon or silicon ceramics. The obtained silicon halide is a polymer which is precipitated on he walls of the reactor as a rubberlike paste which is to be stored under a shielding ags atmsophere because it is flammable in air. The silicon halide polymer prepared according to the present invention can be represented by the general formula $Si_{n+1}F_{4n+e}$ wherein n is an integer (0, 1, 2, 3 ... ).

For simplicity the product is herein described as the monomer $SiF_2$ anyway.

Figure 2:
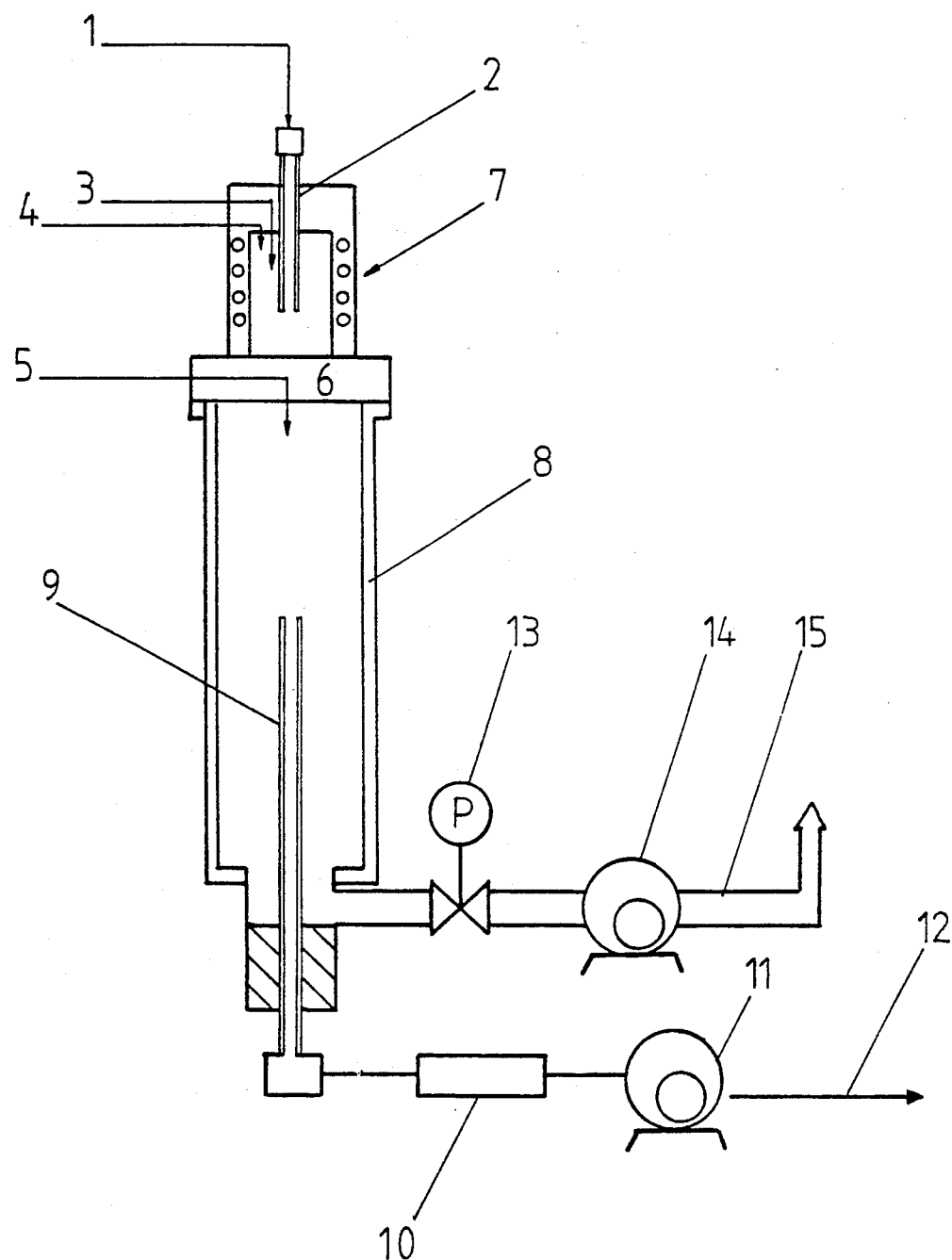

The invention is hereafter described in more detail with reference to the appended figures wherein:

FIG. 1 is picturing the reaction degree of the reaction $SiF_4+Si=2SiF_2$ as a function of pressure at different temperatures, and FIG. 2 is a vertical cross section of a plasma generator which is suitable for carrying out the method of the invention.

As can be seen from FIG. 1, a high temperature and reduced pressure favor the formation of silicon difluoride. It can also be seen that if the reaction is carried out at over 2000° C., even normal pressure can be used (lined area).

A device for producing silicon halide is presented in FIG. 2 and a water-cooled reactor in it is generally marked with reference number 8. At the top of it is the feeding ring 6 through which silicon tetrafluoride is fed through the conduit 5. Above the feeding ring 6 again is a water-cooled induction torch (3 MHz) which is generally indicated by a reference number 7. At the upper end of the induction torch is a central water-cooled feeding pipe 2 for silicon powder to be fed along the conduit 1 and in the upper end of the induction torch 7 are additional inlets for plasma gas 3 and shielding gas 4, both of which are argon.

At the lower end of the water-cooled reactor 8 there is an outlet pipe 15 for gases in which pipe is pressure gauge 13 and a pump 14. Within the water-cooled reactor 8 there is also extending from its lower end vertically upwards a sampler pipe 9 through which gas is sucked from the reaction through a filter 10 with a diaphragm pump 11 to mass spectrometer 12.

The length of the water-cooled reactor 8 is 530 mm and the inner diamter is 125 mm. The length of the water-cooled sampler pipe 9 of stainless steel in turn is 475 mm and inner diameter is 3:2 mm and it is cased with a Pyrex glass tube. The water-cooled feeding pipe 2 is likewise manufactured of stainless steel and the filter 10 contains steelwool.

In the lower part of the water-cooled reactor 8 silicon difluoride polymer is precipitated which can be removed by scraping. With the apparatus pictured in FIG. 2 a reaction temperature of over 2000° C. can easily be reached whereby the reaction degree at normal pressure in practice is 100%. Additionally, the process can be carried out continuously and when the apparatus were used, it was found that to the argon-induced plasma torch fee silicon powder which was under 10 µm vaporized nearly completely.

The horizontal temperature profile of the water-cooled reactor 8 was adjusted so that at the temperature region 1200°–200° C. silicon difluoride is quickly cooled with 1–2 seconds and hence the counter-reacting of silicon difluoride is hindered and polymeric silicon difluoride is caused to precipitate on the walls of the reactor, which silicon difluoride can be collected and by a mild thermal treatment be used in preparation of different silicon-based products.

The invention is explained in more detail in the following examples.

EXAMPLE 1

The apparatus according to FIG. 2 was used to synthetize silicon difluoride from silicon powder and silicon tetrafluoride. Argon, which was used as plasma gas, was fed to the center of the induction torch 7 ata rate of 66 l/min. The water-cooled quartz wall of the torch was shielded with argon shield gas 4 which was fed at a rate of 88 l/min.

Before igniting the plasma torch the mass spectrometer 12 was calibrated through feeding 1, 2 and 5% silicon tetrafluoride 5 to the argon flow through the feeding ring 6. Mass spectrometer was of quadrupole type and it was run on an under voltage of 19 eV to avoid the formation from SiF$_4$ a fragment-SiF$_2$ which would disturb analysis of SiF$_2$ formed in the reaction under examination. The following mass numbers were registered in a multiple ion monitoring mode:

| m/z | Ion |
|---|---|
| 20 | Ar/2 |
| 40 | Ar |
| 47 | SiF |
| 66 | SiF$_2$ |
| 85 | SiF$_3$ |
| 104 | SiF$_4$ |

The gas sample was sucked through the sampling pipe 9 to the mass spectrometer 12 wherein the gas is transported by the diaphragm pump 11 with the aid of the pressure difference generated by the forepump and turbo molecule pump of the mass spectrometer (not shown in the picture). The quenching rate of the gas sample in the sampling pipe 9 from the reaction temperature to under 200° C. was sufficient to avoid the reverse reaction.

The SiF$_2$-content of the gas mixture to be analyzed was calculated with the following formula by comparing the mass spectrum with the spectrum of a known calibration mixture (the figures picture the intensity of the mass in question):

$$\text{SiF}_2\text{-content (\%)} = \frac{66_{mixt}/66_{calibr}}{(66_{mixt}/66_{calibr} + 104_{mixt}/104_{calibr})} \times 100\%$$

The plasma was ignited when to the gastight apparatus a pressure of 0.25 bar had been sucked with a water ring pump 14. The plate power of the plasma generator was adjusted to 23 kW. The SiF$_2$-flow was adjusted on a scale to 13.9 grams per minute, corresponding 3 l/min and 1.9% portion of volume of the total gas flow.

Silicon powder 1 (d50=5 µm) was led pneumatically onto the plasma reactor and fed to the center of the plasma torch with the feeding pipe 2. The mass flow of the feed was changed on both sides of the SiF$_4$/Si-stoichiometry so that first 2.5 g/min ws fed and after the stabilization of the gas analysis (about 5 min) 4.5 g/min.

The results calculated with calculation formula were as follows:

| Si-feed g/min | Mole-ratio of the feed (SiF$_4$/Si) | SiF$_2$-content (%) |
|---|---|---|
| 2.5 | 1.5 | 62 |
| 4.5 | 0.8 | 70 |

The result can further be improved for example by raising the content of silicon containing componnts in the plasma gas mixture whereby the probabiity of collision of the ions which cause the reaction is increased. Even the optimizing of the feed techniques of the silicon reactants will improve the result.

We claim:

1. A method for preparing a reactive silicon halide and its homologues by reducing silicon tetrahalide in a plasma torch under shield gas atmosphere, said method comprising using silicon powder as a reducing agent and quickly cooling the obtained reactive silicon halide or its homologues to a temperature of between 1200° C. and 200° C. to prevent a reverse reaction of the obtained reactive silicon halide or its homologues.

2. A method according to claim 1, in which the reduction is conducted at a temperature of at least 2000° C. and essentially at normal pressure.

3. A method according ot claim 1 or 2, in which the obtained reactive silicon halide or its homologue is cooled within 1–2 seconds.

4. A method according to any of the preceding claims, in which silicon powder having a particle size under 10 µm is used as the reducing agent.

5. A method according to any of the preceding claims, in which silicon tetrafluoride and silicon are fed to the plasma torch at a molar ratio of about 0.8:1–1.5:1.

6. A method according to claim 2, in which the obtained reactive silicon halide or its homologue is cooled within 1–2 seconds.

7. A method according to claim 2, in which silicon powder having a particle size under 10 μm is used as the reducing agent.

8. A method according to cliam 3, in which silicon powder having a particle size under 10 μm is used as the reducing agent.

9. A method according to claim 6, in which silicon powder having a particle size under 10 μm is used as the reducing agent.

* * * * *